(12) United States Patent
Ikeda (10) Patent No.: US 6,532,466 B1
(45) Date of Patent: Mar. 11, 2003

(54) INFORMATION PROCESSING APPARATUS FOR MANAGING DATA ACCORDING TO MODE

(75) Inventor: Kazunori Ikeda, Yawata (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/154,057

(22) Filed: Sep. 16, 1998

(30) Foreign Application Priority Data

Nov. 19, 1997 (JP) .............................................. 9-317827

(51) Int. Cl.⁷ .............................................. G06F 17/30
(52) U.S. Cl. .............................. 707/100; 707/3; 707/7; 711/108
(58) Field of Search ................................ 707/204, 7, 3, 707/200, 100; 711/108

(56) References Cited

U.S. PATENT DOCUMENTS

| 4,707,805 | A | * | 11/1987 | Narusawa et al. | ............. 360/32 |
| 4,907,194 | A | * | 3/1990 | Yamada et al. | ............. 365/49 |
| 5,267,190 | A | * | 11/1993 | Easley et al. | ............. 365/49 |
| 5,414,704 | A | * | 5/1995 | Spinney | ............. 370/60 |
| 5,418,970 | A | * | 5/1995 | Gifford | ............. 395/800 |
| 5,438,535 | A | * | 8/1995 | Lattibeaudiere | ............. 365/49 |
| 5,440,728 | A | * | 8/1995 | Fujiwara | ............. 395/419 |
| 5,606,712 | A | | 2/1997 | Hidaka | ............. 712/1 |
| 5,608,889 | A | * | 3/1997 | Werlinger | ............. 711/217 |
| 5,680,607 | A | | 10/1997 | Brueckheimer | ............. 707/7 |
| 5,890,201 | A | * | 3/1999 | McLellan et al. | ............. 711/108 |
| 5,918,229 | A | * | 6/1999 | Davis et al. | ............. 707/10 |
| 5,956,336 | A | * | 9/1999 | Losche et al. | ............. 370/392 |
| 6,182,060 | B1 | * | 1/2001 | Hedgcock et al. | ............. 707/1 |

FOREIGN PATENT DOCUMENTS

| EP | 0369829 A2 | 5/1990 |
| JP | 60008975 A | 1/1985 |

OTHER PUBLICATIONS

IBM Bulletin/ vol. 12, No. 5 Oct. 1969; H. Groer, "Table Search Procedure for High–Performance Program Residence Unit".

* cited by examiner

*Primary Examiner*—John Breene
*Assistant Examiner*—Cheryl Lewis
(74) *Attorney, Agent, or Firm*—David G. Conlin; Steven M. Jensen; Edwards & Angell, LLP (57) ABSTRACT

An information processing apparatus for managing data of a plurality of modes such as schedule and address book, includes a RAM which has a data contents area for storing the contents of data, and a data address area for storing addresses where the respective data are stored in the data contents area while grouping the addresses according to mode.

15 Claims, 12 Drawing Sheets

| | | 61a | 61b | 61c | | |
|---|---|---|---|---|---|---|
| | 1 | TEL1 | 0000 | 0018 | 003E | 0061 |
| | | | 00A5 | | | |
| | 2 | TEL2 | 004D | 0075 | | |
| | | | | | | |
| | 3 | SCHD. | 0094 | | | |
| | | | | | | |
| | 4 | MEMO | 00C1 | 00D1 | 00DB | |
| | | | | | | |
| | 5 | ANN. | 007A | | | |

61

6 1 a : MODE NUMBER FIELD
6 1 b : MODE FIELD
6 1 c : ADDRESS FIELD

| 61a | 61b | 61c | | | |
|---|---|---|---|---|---|
| 1 | TEL1 | 0000 | 0018 | 003E | 0061 |
| | | 00A5 | | | |
| 2 | TEL2 | 004D | 0075 | | |
| | | | | | |
| 3 | SCHD. | 0094 | | | |
| 4 | MEMO | 00C1 | 00D1 | 00DB | |
| 5 | ANN. | 007A | | | |

61a : MODE NUMBER FIELD
61b : MODE FIELD
61c : ADDRESS FIELD

FIG. 3

| 62a | 62b | 62c | 62d |
|---|---|---|---|
| 0 | 0000 | TEL1-1 | 24 |
|  | 0018 | TEL1-2 | 38 |
|  | 003E | TEL1-3 | 15 |
|  | 004D | TEL2-1 | 20 |
|  | 0061 | TEL1-4 | 20 |
|  | 0075 | TEL2-2 | 5 |
|  | 007A | ANN-1 | 26 |
|  | 0094 | SCHD-1 | 17 |
|  | 00A5 | TEL1-5 | 28 |
|  | 00C1 | MEMO-1 | 16 |
|  | 00D1 | MEMO-2 | 10 |
|  | 00DB | MEMO-3 | 20 |

62a: MODE NUMBER FIELD
62b: ADDRESS FIELD
62c: DATA FIELD
62d: DATA LENGTH FIELD

F I G. 4

DATA LEADING CODE
RECORDED DATA LENGTH
DELIMITER CODE

F I G. 5

64 : UNUSED BYTE COUNT AREA

FIG. 6

| 65a | 65b | 65c | 65d | 65e | 65f | 65g |
|---|---|---|---|---|---|---|
| 0 | 3 | 1 | 0 | 1 | 0 | 5words |
| 1 | 0 | 0 | 1 | 0 | 1 | 10words |
|   |   |   |   |   |   |   |

0: NON-SELECTED
1: SELECTED

MODE NUMBER
(0: ALL MODES)

0: NOT SET
1: SET

65a: SELECTING FLAG
65b: MODE SPECIFYING SECTION
65c: RECORDED-DATE ORDER FLAG
65d: SEARCHED-DATE ORDER FLAG
65e: DATA-LENGTH ORDER FLAG
65f: SPECIFIED SEARCHING ORDER FLAG
65g: DISPLAY STATE SECTION

FIG. 7

DATA LEADING CODE SECTION
MODE NUMBER SECTION
CONTENTS SECTION
RECORD DELIMITER CODE SECTION
RECORDED DATE SECTION
SEARCH DELIMITER CODE SECTION
SEARCHED DATE SECTION

| 62a | 62b | 62c | 62d |
|---|---|---|---|
| 1 | 0000 | TEL1-1 | 24 |
|   | 0018 | TEL1-2 | 38 |
|   | 003E | TEL1-3 | 15 |
|   | 004D | TEL1-4 | 20 |
|   | 0061 | TEL1-5 | 28 |
| 2 | 007D | TEL2-1 | 20 |
|   | 0091 | TEL2-2 | 5 |
| 3 | 0096 | SCHD-1 | 17 |
| 4 | 00A7 | MEMO-1 | 16 |
|   | 00B7 | MEMO-2 | 10 |
|   | 00C1 | MEMO-3 | 20 |
| 5 | 00D5 | ANN-1 | 26 |
| 0 | 00EF | MEMO-4 | 10 |
|   | 00F9 | TEL1-6 | 10 |

62a : MODE NUMBER FIELD
62b : ADDRESS FIELD
62c : DATA FIELD
62d : DATA LENGTH FIELD

FIG. 12

6 6 a : MODE NUMBER FIELD
6 6 b : MODE DATA NUMBER FIELD
6 6 c : MODE RECORDED DATE FIELD
6 6 d : RECORDING NUMBER FIELD
6 6 e : USER SPECIFIED ORDER FIELD

FIG. 13

INFORMATION PROCESSING APPARATUS FOR MANAGING DATA ACCORDING TO MODE

FIELD OF THE INVENTION

The present invention relates to information processing apparatus for managing information of a plurality of modes, such as schedule and address books.

BACKGROUND OF THE INVENTION

For example, according to a conventional technique disclosed in Japanese publication of unexamined patent application (Tokukaisho) No. 60-8975, the time required for searching for data can be shortened by providing an index table to store the leading address and leading data of each sector of data which are recorded in numerical order.

However, the technique disclosed in this publication does not have management modes corresponding to more than one kind of data, such as telephone number, schedule, and memo, respectively. Namely, this technique does not relate to electronic devices for recording and searching for data according to mode.

Specifically, according to the data recording and searching method disclosed in the above-mentioned Japanese publication of unexamined patent application No. 60-8975, the index table is created according to data arranged in numerical order. Therefore, when searching for data according to mode, there is no searching method other than searching through data in sequence from the first data. Consequently, a high-speed search can not be achieved.

Moreover, when recording particular data, the order of recording the particular data is recorded after searching through recorded data. Hence, the time required for recording is the total of the time taken for searching and the time required for making a space corresponding to the length of the particular data by shifting data located at and after the position where the particular data is to be recorded.

Regarding a conventional electronic device capable of recording data, as disclosed in the Japanese publication of unexamined patent application No. 60-8975, there is a known device having an area for storing the addresses of data and an area for storing the contents of data separately. However, there is no device capable of recording and searching for data according to kind of data such as telephone number and schedule. Moreover, in order to record particular data, it takes the total of the time taken for searching for a position where the particular data is to be recorded by searching through data in sequence from the first data and the time required for making a space corresponding to the length of the particular data by shifting data located at after the position where the particular data is to be recorded. Consequently, high-speed recording could not be realized.

Meanwhile, in the case where the contents of data are stored while being grouped according to mode, in order to record particular data, it is necessary to search for an address at which the particular data is to be recorded and then shift data located at and after the address by an amount corresponding to the length of the particular data to be recorded. Therefore, when a number of data are stored at and after the address, it takes a long time to shift these data. Namely, it requires a long time for data recording.

SUMMARY OF THE INVENTION

It is an object of the present invention to realize high-speed processing in an information processing apparatus capable of recording and searching for data according to mode.

In order to achieve the above object, an information processing apparatus of the present invention for managing data of more than one kind of mode, includes a data contents memory for storing the contents of data, and a data address memory for storing the addresses of the respective data stored in the data contents memory while grouping the addresses according to mode.

In this structure, the addresses of the respective data are stored in the data address memory while being grouped according to mode. Therefore, when searching for data of a particular mode, it is only necessary to search through an area of the data address memory where the particular mode is stored, thereby achieving high-speed searching.

Moreover, in this information processing apparatus, the data contents memory can be arranged so as to store the contents of data which is to be newly recorded, after the end of the contents of already recorded data irrespectively of kinds of modes.

With this structure, when adding new data, the new data is stored after the end of the contents of data stored in the data contents memory irrespectively of kinds of modes. It is thus possible to achieve high-speed recording because there is no need to move the already recorded data.

Furthermore, the above-mentioned information processing apparatus can be arranged so that the data contents memory stores data while grouping the data according to mode, and include a mode data number memory for storing the number of the data of each mode stored in the data contents memory, and moving means for referring to the mode data number memory and moving the data of a mode including the largest number of data together to the head of the data contents memory.

When adding data of a particular mode to the data contents memory in which data of a plurality of modes are stored while being grouped according to mode, if data of other mode are stored subsequent to the particular mode, it is necessary to move the data of the subsequent mode backward so as to make a free space for the addition of the data of the particular mode. With this structure, since the data of the mode including the largest number of data are moved together to the head of the data contents memory, it is possible to reduce the volume of data which need to be moved for the addition of data, thereby realizing high-speed data recording.

For a fuller understanding of the nature and advantages of the invention, reference should be made to the ensuing detailed description taken in conjunction with the accompanying drawings.

DESCRIPTION OF THE PREFERRED EMBODIMENTS

[Embodiment 1]

The following description will explain an embodiment of the present invention with reference to FIGS. 1 to 9.

Figure 1:
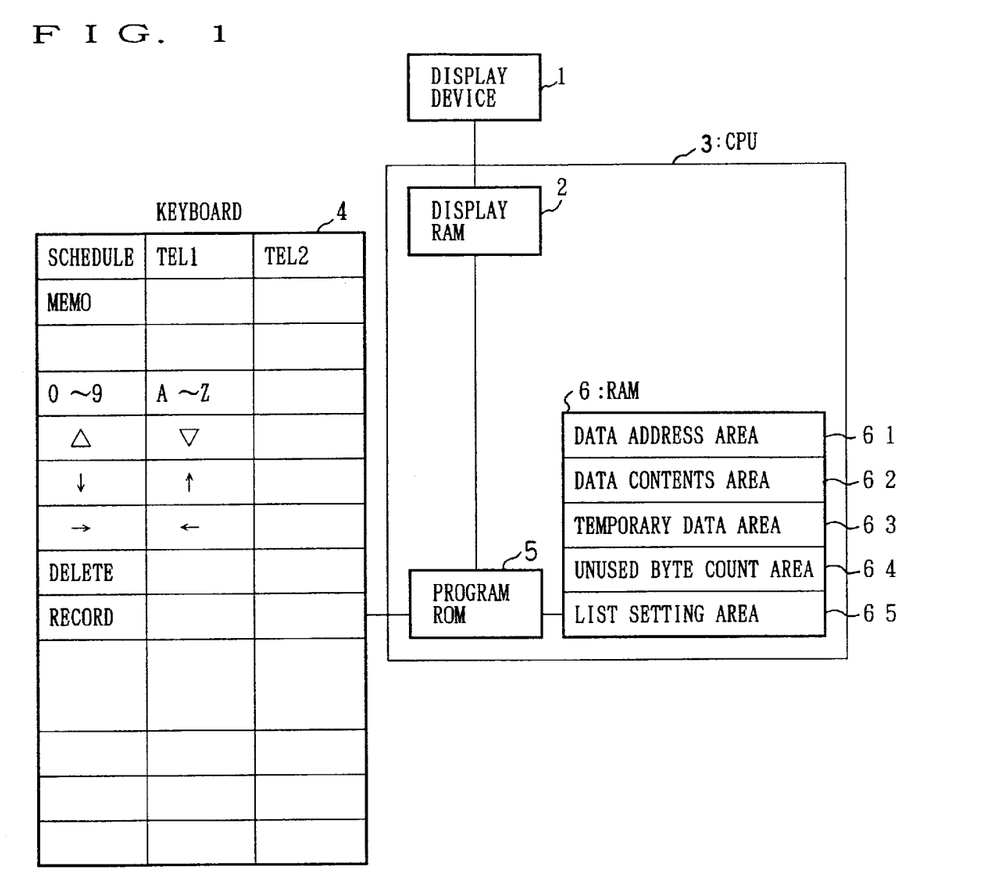
FIG. 1 is a block diagram showing a schematic structure of an information processing apparatus according to one embodiment of the present invention.

As illustrated in FIG. 1, an information processing apparatus of this embodiment is formed mainly by a display device 1 (display), a display RAM 2, a CPU 3 (moving means, deletion candidate selector), a keyboard 4 (input means), a program ROM 5 (recording medium), and a RAM 6.

When a user enters an input through the keyboard 4, the CPU 3 operates according to a preset program in the program ROM 5, writes data in the display RAM 2 to display the data, or accesses to the RAM 6 to record or search for the data.

The RAM 6 includes a data address area 61 (data address memory), a data contents area 62 (data contents memory), a temporary data area 63, an unused byte count area 64, and a list setting area 65 (display conditions memory). FIGS. 2 to 6 show the structures of the five kinds of areas of the RAM 6.

The data address area 61 and data contents area 62 are areas necessary for storing and searching for data at high speeds.

Figure 2:
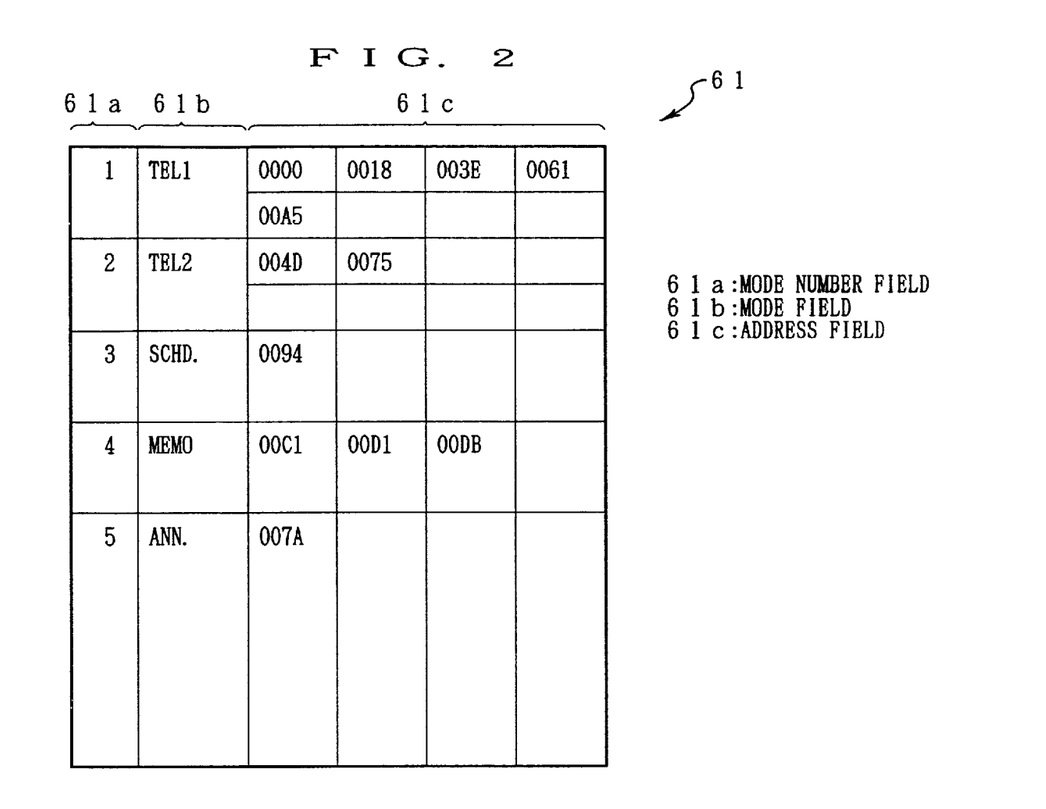
FIG. 2 is a view for explaining a state in which data are stored in a data address area of the information processing apparatus.

As illustrated in FIG. 2, the data address area 61 has an address field 61c for storing the addresses of data stored in the data contents area 62. In order to store the addresses of data so that the addresses of the same kind (i.e., mode) of data are stored together, the data address area 61 includes a mode number field 61a for storing a mode number which represents a mode by a numeral, and a mode field 61b for storing the name of a mode corresponding to each mode number.

For instance, according to the example shown in FIG. 2, the "TEL1" mode, "TEL2" mode, "SCHEDULE (SCHD.)" mode, "MEMO" mode, and "ANNIVERSARY (ANN.)" mode are assigned to the mode numbers "1", "2", "3", "4", and "5", respectively. For example, the "TEL1" mode is a mode relating to a telephone book, and includes names, telephone numbers, etc. as the contents of data. The "TEL2" mode is also a mode relating to a telephone book. By including modes relating to a plurality of telephone books, the user can manage telephone numbers separately according to, for example, private and business purposes.

In order to perform high-speed searching, the addresses of data are stored in the address field 61c of the data address area 61 during data recording, in an order which is optimum for searching in each mode. For example, in the case of the "TEL1" mode, since searching for data is performed based usually on the names of data, the data addresses stored in the address field 61c are arranged according to alphabetical order of the names contained in the data contents. In the case of the "SCHD." mode, the data addresses stored in the address field 61c are arranged in order of dates contained in the data contents. Besides, the order in which the data addresses are stored in the address field 61c can be set by the user.

Thus, in the data address area 61 shown in FIG. 2, since the addresses of data are arranged in optimum order for searching in the address field 61c, it is not necessary to compare data stored in the data contents area 62 (shown in FIG. 3) with each other in sequence and display the data when searching for a particular address. Accordingly, the data addresses can be read out in order in which the data addresses are stored in the address field 61c of the data address area 61, and then the data having the particular address can be read out from the data contents area 62, thereby achieving high-speed searching.

Figure 3:
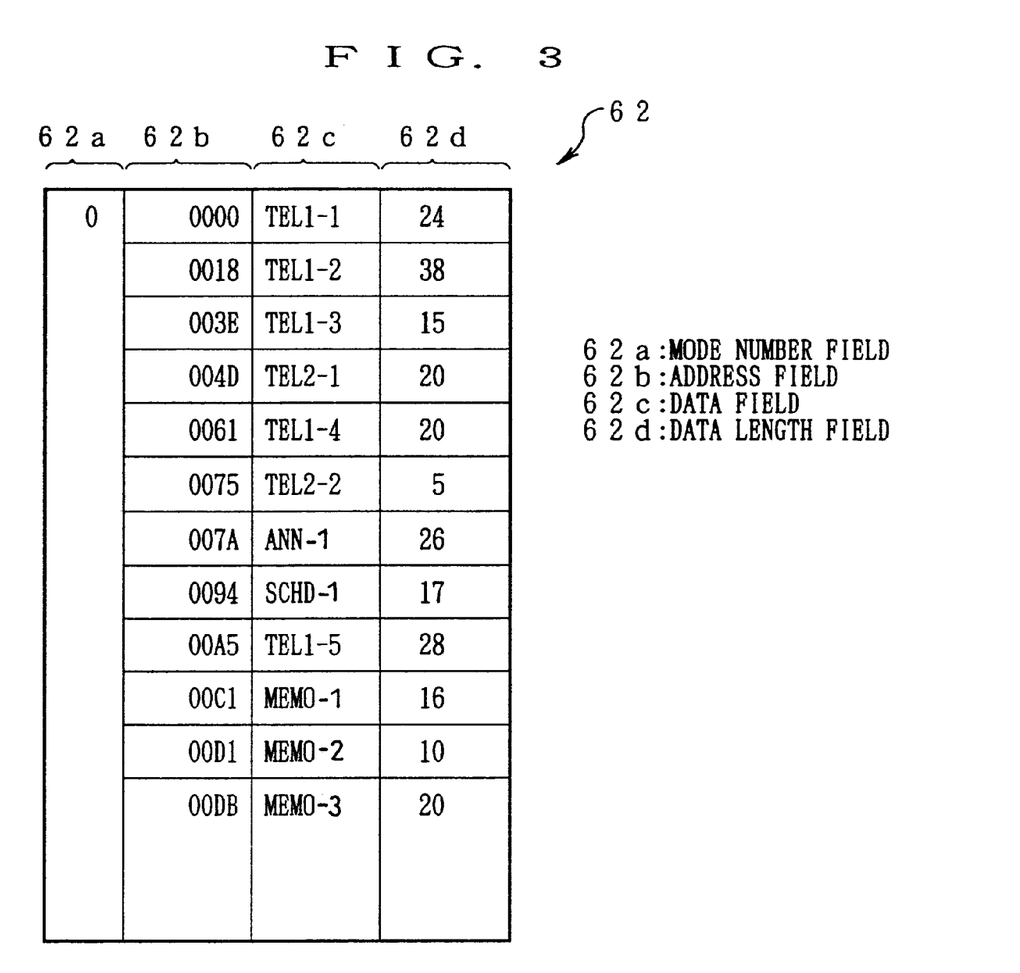
FIG. 3 is a view for explaining a state in which data are stored in a data contents area of the information processing apparatus.

As illustrated in FIG. 3, the data contents area 62 includes a data field 62c for storing the contents of data, an address field 62b representing the address of data, a mode number field 62a representing a mode number, and a data length field 62d (data length memory) showing the data length of recorded data.

For example, when data of the "TEL1" mode is recorded by the user, the CPU 3 stores the mode number ("1" in this example) of the data together with the contents of data in the data field 62c of the data contents area 62 as explained later with reference to FIG. 7. At this time, the length of the recorded data is stored in the data length field 62d.

Moreover, the CPU 3 stores the address (value of the address field 62b) in the data contents area 62 where the data is stored, in the address field 61c of the corresponding mode number.

In the example shown in FIG. 3, the mode number "0" which is stored in the mode number field 62a indicates a state in which data are arranged in order of recording irrespectively of modes.

Thus, according to this embodiment, in the data contents area 62, the data are arranged in order of recording irrespectively of modes. Therefore, when recording new data, it is only necessary to record the new data after the last data in the data contents area 62 without moving other data, thereby realizing high-speed recording.

Specifically, in the data address area 61 shown in FIG. 2, since the data are arranged in optimum order for searching, searching for data can be performed at a high speed. Moreover, in the data contents area 62 shown in FIG. 3, since data are arranged in order of recording, recording of data can be carried out at a high speed.

If there is a shortage of the unused area of the RAM 6 to record data, the data length field 62d is used during deletion of data to make a space as described in detail later. More specifically, when displaying a list of candidates of data to be deleted, data having a byte count close to the difference between the byte count of data to be recorded and the byte count of the unused area is selected with reference to the data length field 62d.

The contents of data are stored in the data field 62c. As to the information to be stored as the contents of data, it is possible to arbitrarily select information for each mode. For example, in the case of the "TEL1" mode, as described above, information such as names and telephone numbers are stored. In order to simplify the explanation, in the data field $62c$ shown as an example in FIG. 3, the mode of each data and a numeral indicating the position of each data within a set of data of the same mode, instead of the actually stored information, are shown. FIG. 7 is illustrated in the same manner. For example, the "TEL1-1" shown at the top of FIG. 3 indicates that the data is the first data of the "TEL1" mode.

Figure 7:
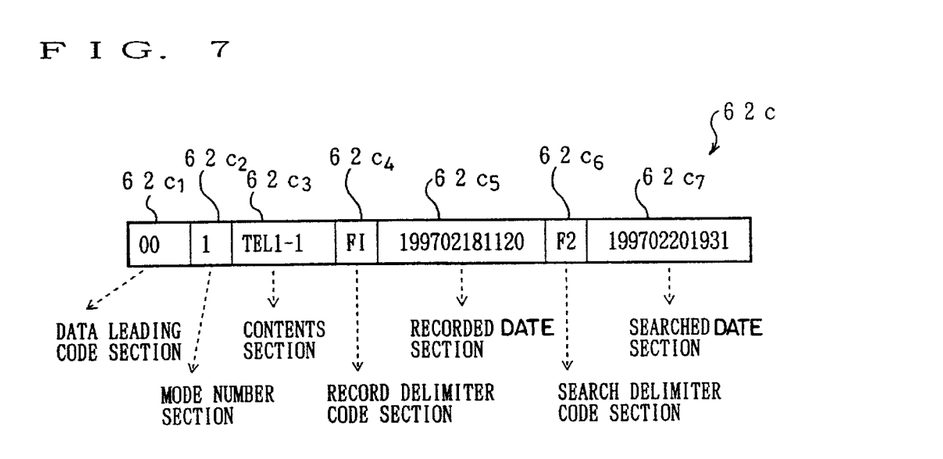
FIG. 7 is a view for explaining an example of the contents of data stored in the data contents area.

In the data field $62c$, the data is actually stored in a structure like that shown in FIG. 7. More specifically, a data leading code section $62c_1$ where a data leading code "00" representing the head of the data field $62c$ is provided at the head of the data field $62c$. Subsequently, a mode number section $62c_2$, a contents section $62c_3$, a record delimiter code section $62c_4$, a recorded date section $62c_5$ (recorded date memory) $62c_5$, a search delimiter code section $62c_6$, and a searched date section $62c_7$ (searched date memory) are provided in this order.

In the recorded date section $62c_5$, the day and time at which the data was recorded are stored. Therefore, if there is a shortage of the unused area of the RAM 6 in recording data, the recorded day and time of the respective data stored in the recorded date section $62c_5$ are compared to each other when displaying a list of candidates of data to be deleted to make a free space, and a list of data arranged sequentially in order of recorded date so that the data with the earliest recorded date comes first in the list is displayed.

In the searched date section $62c_7$, the latest day and time at which each data was searched out are stored. Accordingly, if there is a shortage of the unused area of the RAM 6 in recording data, the recorded day and time of the respective data stored in the searched date section $62c_7$ are compared to each other when displaying a list of candidates of data to be deleted for making a free space, and a list of data arranged sequentially in order of searched date so that the data with the earliest searched date comes first in the list is displayed.

A record delimiter code "F1" and a search delimiter code "F2" are stored in the record delimiter code section $62c_4$ and search delimiter code section $62c_6$, respectively. These codes are provided so that the positions of the recorded date section $62c_5$ and searched date section $62c_7$ are easily searched out. Namely, for example, in order to obtain the information in the recorded date section $62c_5$, a search for a record delimiter code in data is carried out. When the position of the record delimiter code is found, it is possible to easily know where the recorded date section $62c_5$ starts. A similar effect is also produced by the search delimiter code.

A mode number is stored in the mode number section $62c_2$ because the information indicating which data corresponds to which mode is required for grouping data according to mode in the data address area 61 and data contents area 62.

Moreover, the contents of data are stored in the data contents section $62c_3$. For example, in the case of the "TEL1" mode, the contents of data to be stored in the contents section $62c_3$ are name, telephone number, etc.

Figure 4:
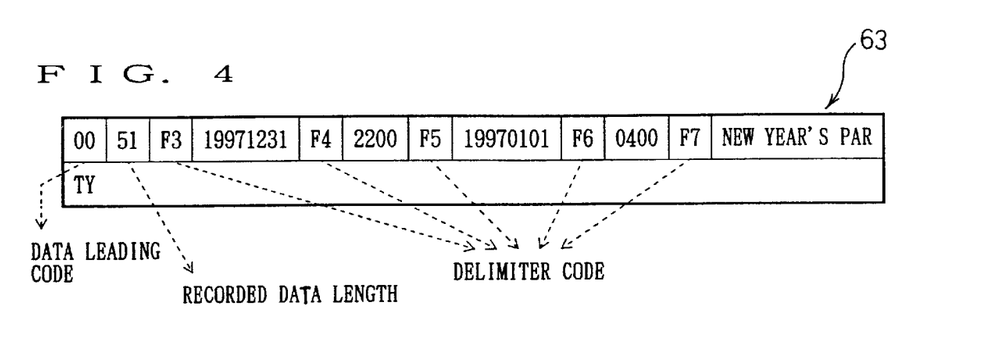
FIG. 4 is a view for explaining an example of data stored in a temporary data area of the information processing apparatus.

As illustrated in FIG. 4, the temporary data area 63 of the RAM 6 is an area for temporarily storing data to be recorded during recording of the data. The data stored in the temporary data area 63 includes the data leading code "00" representing the head of data and the recorded data length, and is stored in a state in which the contents of data are separated from each other by delimiter codes ("F3" to "F7").

In the example shown in FIG. 4, since there are 19 bytes from the data leading code "00" to the delimiter code "F7" (two numerals are counted as one byte) and there are 32 bytes in "NEW YEAR'S PARTY" (one letter is counted as two bytes), there are 51 bytes in total. Then, "51" is stored as the recorded data length.

Thus, with the use of the temporary data area 63, if there is a shortage of the capacity of the RAM 6 when recording data, it is possible to eliminate the operation of reentering data to be recorded, after deleting recorded data to make a free space. Namely, after the deletion of the recorded data, by simply reading out data from the temporary data area 63 and recording the data in the data contents area 62, the recording of the data is completed.

Figure 5:
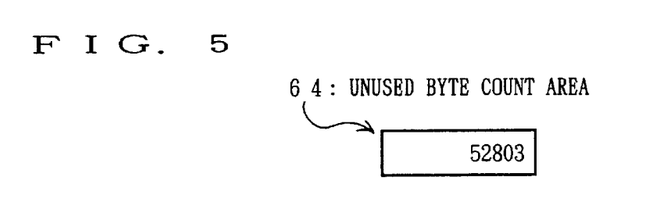
FIG. 5 is a view for explaining an example of data stored in an unused byte count area of the information processing apparatus.

As illustrated in FIG. 5, the byte count of the unused area of the RAM 6 is stored in the unused byte count area 64 of the RAM 6.

The recorded data length stored in the temporary data area 63 and the byte count stored in the unused byte count area 64 are used when displaying the remaining byte count and the byte count of data to be recorded and when calculating the difference between the remaining byte count and the byte count of data to be recorded, as explained later.

Figure 6:
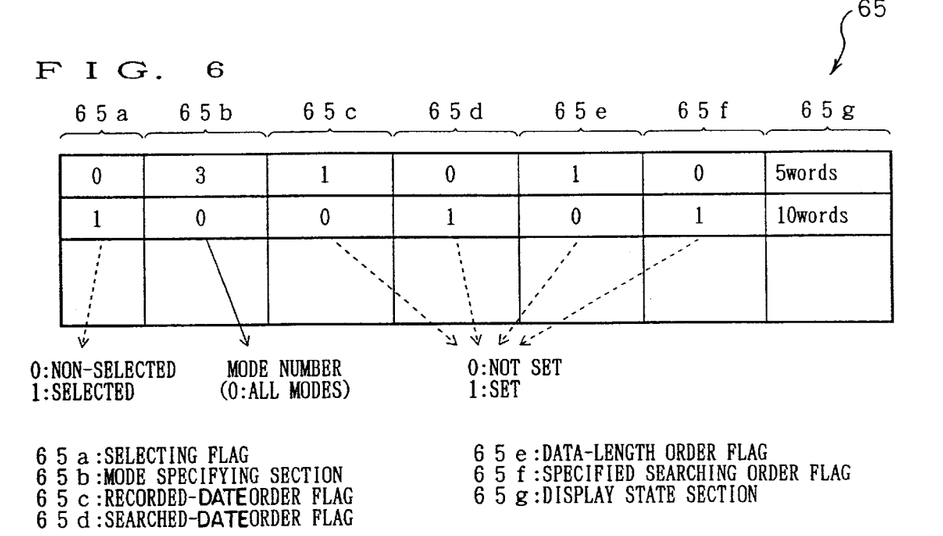
FIG. 6 is a view for explaining a state in which data are stored in a list setting area of the information processing apparatus.

The list setting area 65 of the RAM 6 is provided so as to allow the user to specify kinds of data to be displayed in a list of data contents and data length that is displayed for letting the user know which data is to be deleted among the recorded data if there is a shortage of the capacity of the RAM 6 when recording data.

As shown in FIG. 6, the list setting area 65 includes a selecting flag 65a, a mode specifying section 65b, a recorded-date order flag 65c, a searched-date order flag 65d, a data-length order flag 65e, a specified searching order flag 65f, and a display state section 65g.

In the mode specifying section 65b, a mode number is stored so as to specify the data of which mode are to be listed and displayed. For example, when "2" is stored, a list of the data of the "TEL2" mode is displayed according to the relation between the mode number field 61a and mode field 61b of the data address area 61 shown in FIG. 2.

"0" or "1" is stored in each of the recorded-date order flag 65c, searched-date order flag 65d, data-length order flag 65e, and specified searching order flag 65f.

The list is displayed according to the conditions corresponding to an area where "1" is stored. The conditions corresponding to an area where "0" is displayed are irrelevant to the display of the list. More specifically, when "1" is stored in the recorded-date order flag 65c, data are listed and displayed sequentially in order of recorded date so that the data with the earliest recorded date comes first in the list. When "1" is stored in the searched-date order flag 65d, data are listed and displayed sequentially in order of searched date so that the data with the earliest searched date comes first in the list. When "1" is stored in the data-length order flag 65e, data are listed and displayed sequentially in order of data length so that the data with the longest data length comes first in the list.

Meanwhile, when "1" is stored in the specified searching order flag 65f, data are listed and displayed sequentially according to the conditions specified by the user. For instance, when the mode number "1" representing the "TEL1" mode is stored in the mode specifying section 65b at the time "1" is stored in the specified searching order flag 65f, it is possible for the user to specify conditions, for example, list and display data whose names start with "K".

The display state section 65g is an area for setting which part of each data is to be listed and displayed. Specifically, it is possible to set how many letters from the head of each data stored in the contents section $62c_3$ of the data field $62c$ of the data contents area 62 are to be displayed, or, for example, in the case of data of the "TEL1" mode or "TEL2" mode, it is possible to set so that only the telephone numbers are displayed.

The following description will explain such conditions in detail with reference to FIG. 6. First, in the first conditions, "3" is set in the mode specifying section 65b, and therefore data to be listed and displayed are the data of the schedule mode ("SCHD." mode) corresponding to the mode number "3" in the data address area 61. Moreover, here, since "1" is stored in the data-length order flag 65e, the data of the schedule mode are listed and displayed sequentially in order of data length so that the data with the longest data length comes first in the list. Furthermore, since a condition "5 words" is set in the display state section 65g, five letters from the head of the data stored in the contents section 62$c_3$ of the data field 62c are displayed.

As to the second conditions, "0" is set in the mode specifying section 65b, and therefore all of the data are to be listed and displayed. Moreover, since "1" is set in each of the searched-date order flag 65d and specified searching order flag 65f, the data searched out according to the conditions specified by the user are listed and displayed sequentially in order of searched date so that the data with the earliest searched date comes first in the list. Furthermore, since a condition "10 words" is set in the display state section 65g, ten letters from the head of the data stored in the contents section 62$c_3$ of the data field 62c are displayed.

"0" or "1" is stored in the selecting flag 65a, and a list of data is displayed to meet the condition corresponding to "1" stored in the selecting flag 65a among various types of conditions stored in the list setting area 65. Namely, in the example shown in FIG. 6, the above-mentioned second conditions are selected.

Needless to say, various conditions for displaying a list of data can be set suitably in addition to the two examples shown in FIG. 6. Additionally, it is possible for the user to set new conditions in the areas showing the respective conditions for displaying a list of data, such as the above-mentioned recorded-date order flag 65c, searched-date order flag 65d, data-length order flag 65e, and specified searching order flag 65f.

Figure 8:
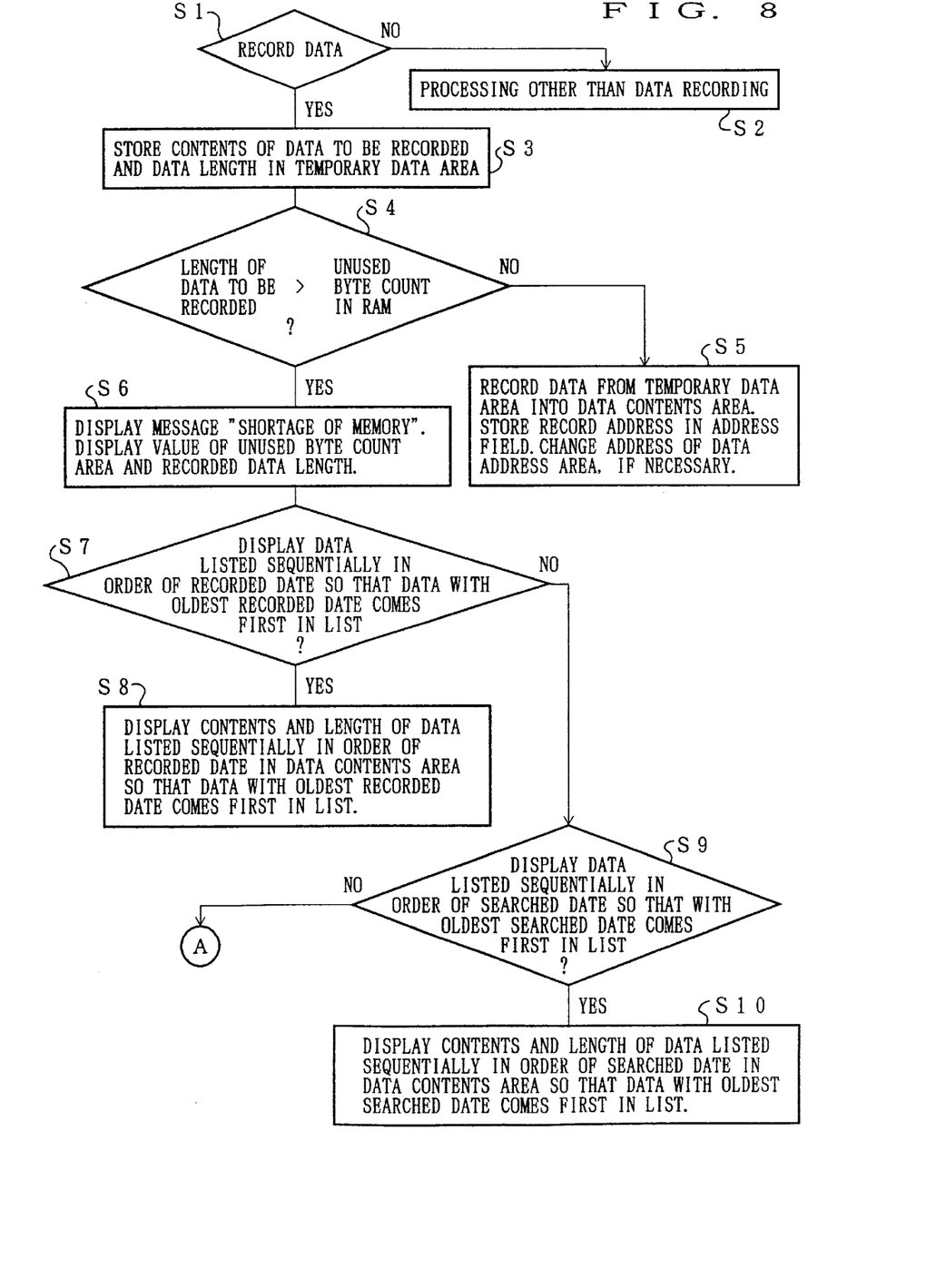
FIGS. 8 and 9 are flow charts of recording data.
Figure 9:
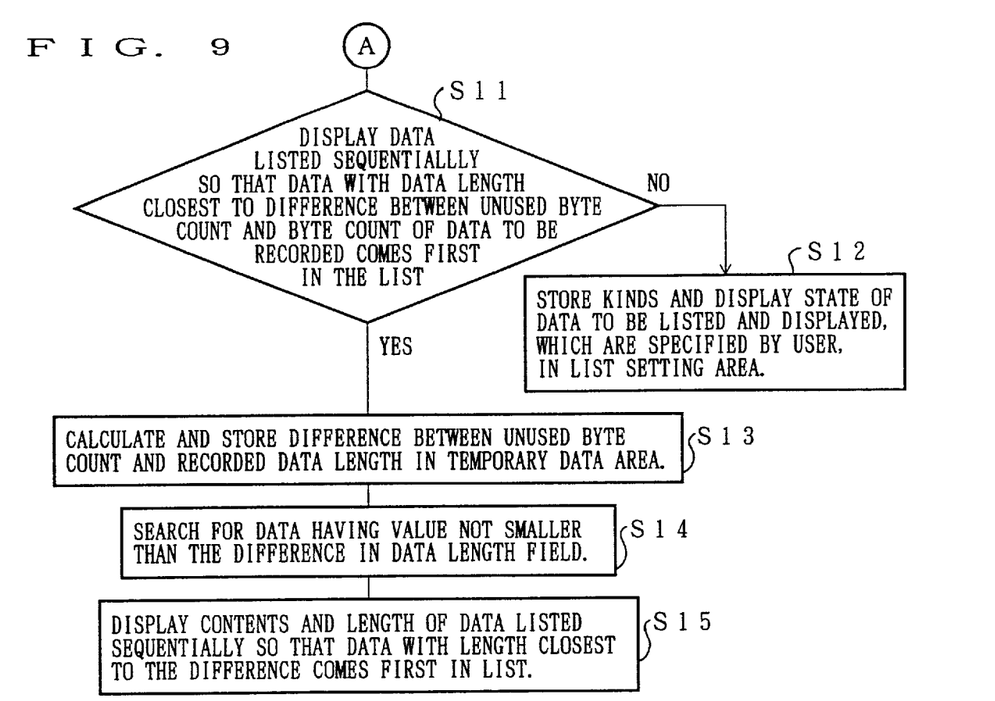

FIGS. 8 and 9 are flow charts of recording data when there is a shortage of free space in the RAM 6.

In step 1 (hereinafter abbreviated as "S1"), the CPU 3 judges whether data is to be recorded. If the data is to be recorded, the program moves to S3. Alternatively, if the data is not to be recorded, the program moves to S2 and processing other than recording of the data is carried out.

In S3, the CPU 3 stores the data to be recorded in the temporary data area 63 of the RAM 6. At this time, the length of the data is calculated, and the calculated value is also stored as the recorded data length in the temporary data area 63.

In S4, the CPU 3 compares the byte count of the unused area of the RAM 6, which is stored in the unused byte count area 64, with the recorded data length stored in the temporary data area 63 in step S3, and judges whether the byte count of the data to be recorded is greater than the byte count of the unused area.

If the result of the judgment in S4 is YES, the program moves to S6. On the other hand, if NO, the program moves to S5.

In the case when the program moves to S5, since the recording of the data in the unused area of the RAM 6 is available, the CPU 3 records the data stored in the temporary data area 63 into the data field 62c of the data contents area 62, calculates the address of the data, and stores the address in the address field 62a. Moreover, the address is added to the address field 61c in the data address area 61.

In the case when the program moves to S6, since there is no free space in the RAM 6 for recording the data, the CPU 3 uses the display RAM 2 to display a message, for example, "shortage of memory" on the display device 1. Furthermore, the value of the unused byte count area 64 and the value of the recorded data length stored in the temporary data area 63 are displayed.

In S7 and the subsequent steps, in order to make a free space in the RAM 6, the CPU 3 displays on the display device 1 a list of candidate data for deletion so that the user can select data to be deleted, from the recorded data.

First, in S7, the CPU 3 judges whether the data are to be listed sequentially in order of recorded date so that the data with the earliest recorded date comes first in the list. If YES, the program moves to S8. If NO, the program moves to S9.

In S8, in order to display a list of data arranged sequentially in order of recorded date so that the data with the earliest recorded date comes first in the list, the CPU 3 compares the recorded dates of the respective data stored in the recorded date section 62$c_5$ in the data field 62c of the data contents area 62, and displays the data in the above-mentioned order. At this time, in order to improve the quality of the list, only a part of the contents section 62$c_3$ is displayed rather than displaying the entire data contents so that other pieces of data are displayed together.

In addition, the CPU 3 displays the value of the data length field 62d in the data contents area 62 as the data length of each data. The value of the data length field 62d is displayed so that the user can easily know the length of each data and which data is to be deleted among the list of data displayed.

In S9, the CPU 3 judges whether the data to be listed and displayed are arranged sequentially in order of searched date so that the data with the earliest searched date comes first in the list. If YES, the program moves to S10. If NO, the program moves to S11 shown in the flow chart of FIG. 9.

In S10, in order to display a list of data arranged sequentially in order of searched date so that the data with the earliest searched date comes first in the list, the CPU 3 compares the searched dates of the respective data stored in the searched date section 62$c_7$ of the data field 62c in the data contents area 62, and displays the data in the above-mentioned order. At this time, in order to improve the quality of the list, only a part of the contents section 62$c_3$ is displayed rather than displaying the entire data contents so that other pieces of data are displayed together.

In addition, the CPU 3 displays the value of the data length field 62d in the data contents area 62 as the data length of each data. With this arrangement, the user can easily know the length of each data and which data is to be deleted among the list of data displayed.

In S11 shown in FIG. 9, when recording data, if there is a shortage of the byte count of free area in the RAM 6, the CPU 3 judges whether data having a data length close to the difference between the byte count of the unused area and the byte count of the data to be recorded are to be listed and displayed. If YES, the program moves to S13. If NO, the program moves to S12.

In S12, the user selects and specifies a type of data to be listed and displayed, and sets which part of the selected data is to be displayed. The contents set by the user are stored in the list setting area 65.

In S13, the CPU 3 calculates the difference between the value of the unused byte count area 64 and the recorded data length stored in the temporary data area 63. In S14, data having a data length not smaller than the difference are selected with reference to the value of the data length field 62d of the data contents area 62.

Then, in S15, the CPU 3 displays the data in sequence so that the data having a data length closest to the difference calculated in S13 comes first in the list. At this time, in order to improve the quality of the list, only a part of the contents section $62c_3$ is displayed rather than displaying the entire data contents so that other pieces of data are displayed together.

In addition, the CPU 3 displays the value of the data length field 62d of the data contents area 62 as the data length of each data. With this arrangement, the user can easily know the length of each data and which data is to be deleted among the list of data displayed.

[Embodiment 2]

The following description will explain another embodiment of the present invention with reference to FIGS. 10 to 14. The structures having the same functions as in those of the above-mentioned embodiment will be designated by the same codes and the explanation thereof will be omitted.

Figure 10:
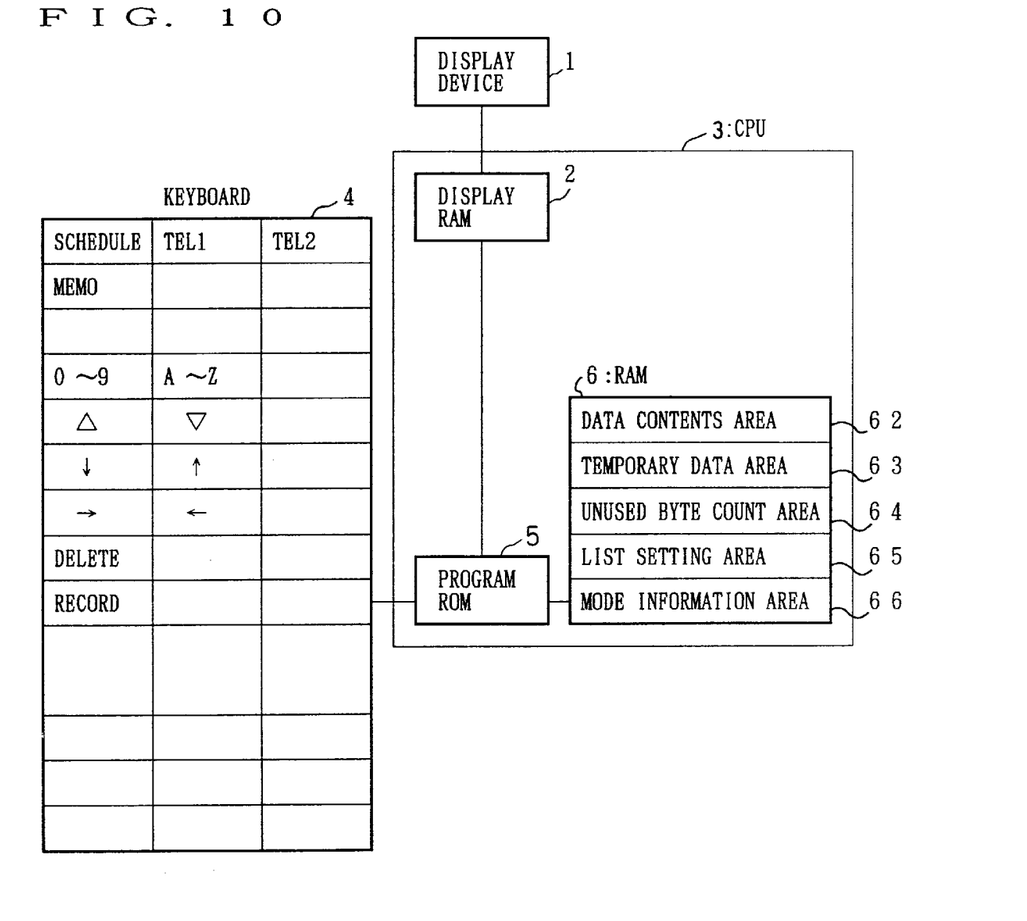
FIG. 10 is a block diagram showing a schematic structure of an information processing apparatus according to another embodiment of the present invention.

As illustrated in FIG. 10, the RAM 6 includes the data contents area 62, temporary data area 63, unused byte count area 64, list setting area 65 explained in Embodiment 1, and a mode information area 66 (latest information memory) instead of the data address area 61.

Figure 11:
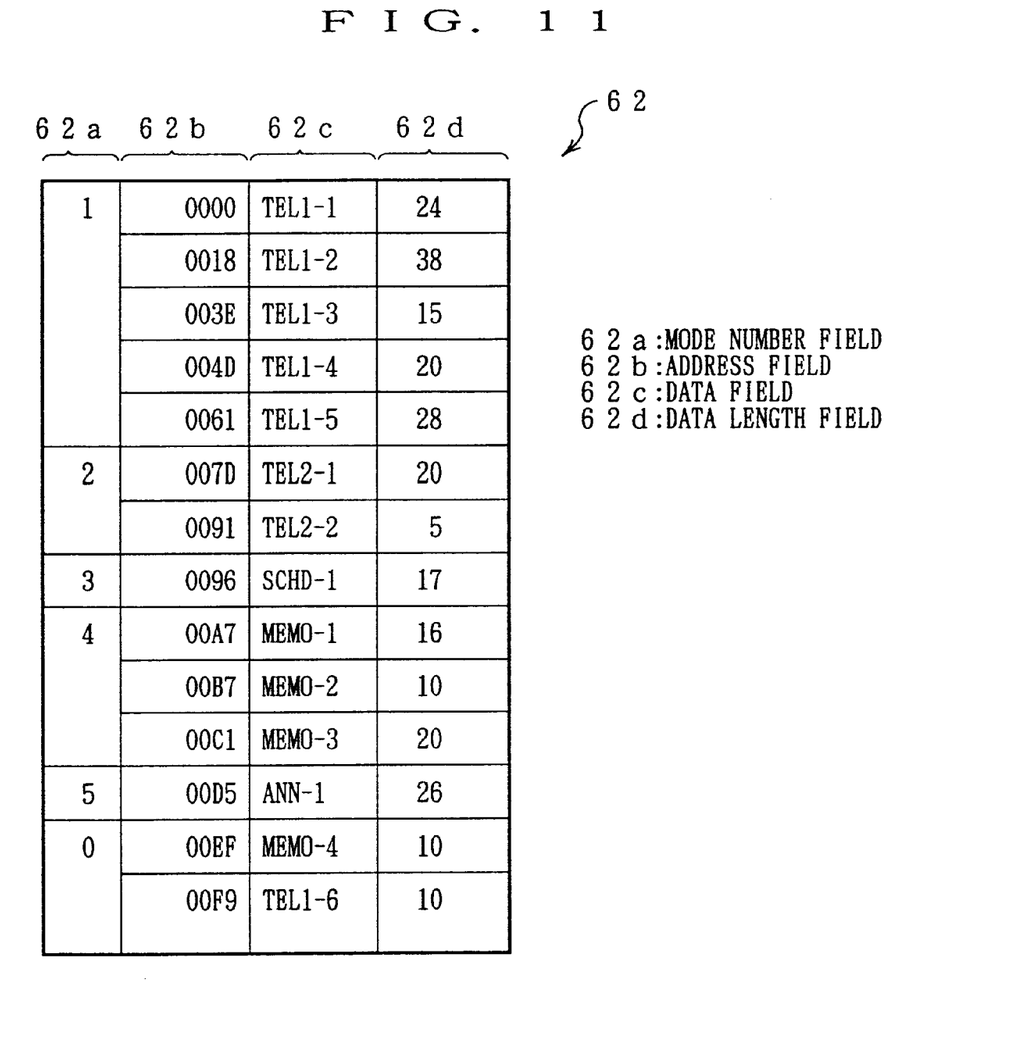
FIG. 11 is a view for explaining a state in which data are stored in a data contents area of the information processing apparatus of the another embodiment.

The order of recording data in the data contents area 62 differs from that of Embodiment 1. Namely, in Embodiment 1, data are arranged in order of recording. By contrast, in Embodiment 2, as shown in FIG. 11, data are recorded in a state in which the data are grouped according to mode.

Figure 12:
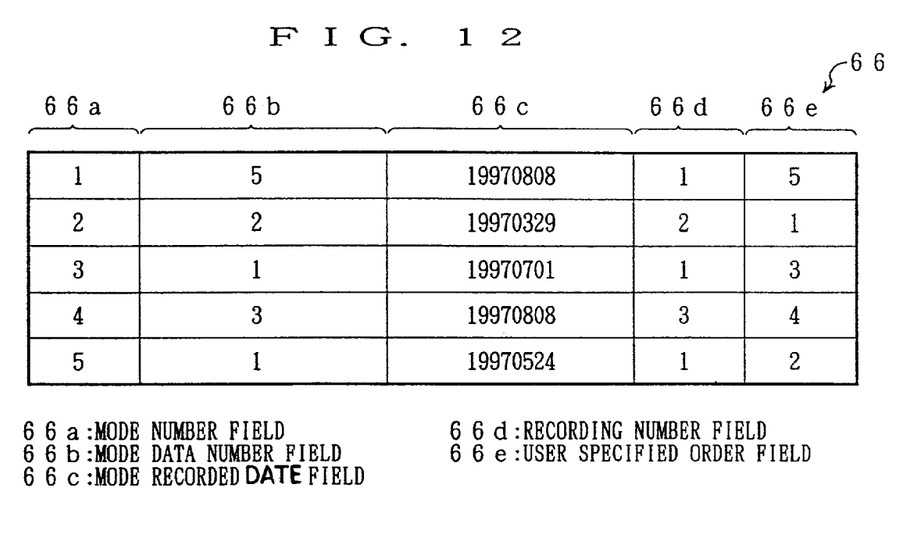
FIG. 12 is a view for explaining a state in which data are stored in a mode information area of the information processing apparatus of the another embodiment.

As illustrated in FIG. 12, the mode information area 66 includes a mode number field 66a, a mode data number field 66b (mode data number memory), a mode recorded date field 66c, a recording number field 66d, and a user specified order field 66e.

In the mode number field 66a, a mode number is stored. In the mode data number field 66b, the number of data recorded in each mode is stored. In the mode recorded date field 66c, the latest date of recording data is stored. In the recording number field 66d, the number of data recorded on the latest date is stored. In the user specified order field 66e, an order of modes set by the user is stored so that the user can rearrange the order of modes stored in the data contents area 62, if necessary.

The number of data of each mode stored in the mode data number field 66b shown in FIG. 12 is used to achieve high-speed data recording. When correcting data or recording new data, it is necessary to move data located at and after an address where the data is to be recorded so as to make a free space. However, if it takes a long time to move data, the time required to complete recording of data inevitably increases. In order to shorten the time required for data recording, it is preferred to decrease the quantity of data which are to be moved for making a free space corresponding to the length of data to be recorded. Therefore, in the structure of this embodiment, data of the respective modes recorded in the data contents area 62 are rearranged sequentially with reference to the mode data number field 66b so that the data of a mode including the largest number of data comes first. This structure enables a shortening of the time required to complete data recording.

For instance, as to the number of data included in the respective modes, according to an example shown in FIG. 12, "TEL1" mode (mode number "1") includes the largest number of data. Then, the "memo" mode (mode number "4"), "TEL2" mode (mode number "2"), "SCHD." mode (mode number "3"), "ANN." mode (mode number "5") follow in this order. Therefore, the data in the data contents area 62 shown in FIG. 11 are rearranged in this order.

The mode recorded date field 66c and recording number field 66d shown in FIG. 12 are also provided to shorten the time required for correcting or recording data.

Namely, a certain user may use a particular mode frequently and rarely use other mode. In such a case, it is considered that data correction or data recording is frequently performed in the particular mode of high frequency in use. In this case, if data of the mode of high frequency in use is recorded near the head of the data contents area 62, a long time is required to move data of modes located after the particular mode whenever performing data correction or data recording in the particular mode. Hence, if the data of the mode of high frequency in use is moved to the end of the data contents area 62, there is no need to move the data of other modes when performing data correction or data recording in the mode of high frequency in use. As a result, the time taken for data correction or data recording is shortened.

When judging which mode is a mode of high frequency in use, the CPU 3 first refers to the mode recorded date field 66c so as to compare the latest dates of recording data of the respective modes with each other. If there are modes having the same latest recorded date, the CPU 3 refers to the recording number field 66d so as to compare these modes in terms of the number of data recorded on the above date. As a result, a mode including the largest number of data is judged to be a mode of the highest frequency in use. Then, the CPU 3 moves the data of the mode of the highest frequency in use to the end of the data contents area 62.

According to the example shown in FIG. 12, it can be understood from the mode recorded date field 66c that the recorded dates of the "TEL1" mode (mode number "1") and "MEMO" mode (mode number "4") are latest. It can also be understood from the recording number field 66d that the "MEMO" mode has a larger number of data recorded on this date than the "TEL1" mode. Thus, the CPU 3 moves the data of the "MEMO" mode to the end of the data contents area 62.

If there are a plurality of modes including the same number of data recorded on the latest recorded date, the user may select any one of modes as the mode to be moved to the end of the data contents area 62.

In this embodiment, in order to allow the user to freely set the order in which the data of the respective modes are stored in the data contents area 62, the above-mentioned user specified order field 66e is provided. The condition of use of electronic devices such as an information processing apparatus of this embodiment varies depending on the user. Therefore, if the order of recording modes in the data contents area 62 is decided according only to a particular rule, the electronic device can not meet the demand of every user. In order to solve such a drawback, the structure of this embodiment is arranged so that the user can specify the order of recording modes, and the specified order is stored in the user specified order field 66e. The CPU 3 rearranges the data in the data contents area 62 according to the order stored in the user specified order field 66e.

Figure 13:
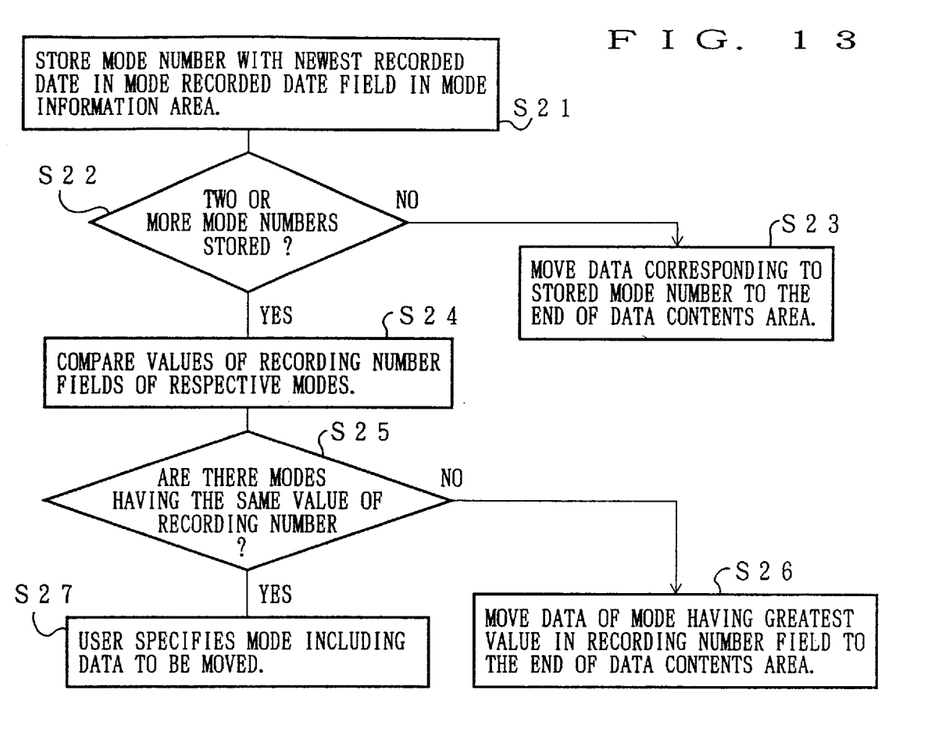
FIG. 13 is a flow chart of changing the order of modes stored in the data contents area.

FIG. 13 is a flow chart of a process for changing the order of modes stored in the data contents area 62.

First, in S21, the CPU 3 refers to the mode recorded date field 66c in the mode information area 66, and compares the latest dates of recording data of the respective modes with each other. Then, the CPU 3 records the mode number of a mode including the data recorded on the latest date among the latest recorded dates of the respective modes.

Next, in S22, the CPU 3 judges whether more than one mode number are stored in S21, i.e., whether there are two or more modes including data recorded on the same latest date in the mode recorded date field 66c. If the result of the judgment is YES, the program moves to S24. If NO, the program moves to S23.

In S23, the CPU 3 moves every data belonging to a mode corresponding to the mode number stored in S21 together to the end of the data contents area 62 (as described in detail later).

In S24, the CPU 3 refers to the mode information area 66, reads out the value stored in the recording number field 66d in respect of the two or more mode numbers stored in S21, and compares the values with each other. As a result, a mode in which data have been recorded most frequently recently is determined.

In S25, according to the result of comparing the values of the recording number field 66d in S24, the CPU 3 judges whether there are modes having the same value. If the result of the judgement is YES, the program moves to S27. If NO, the program moves to S26.

In S26, the CPU 3 moves every data belonging to a mode having the greatest value as the result of comparing the values of the recording number field 66d of the respective modes together to the end of the data contents area 62.

Only when a plurality modes have the same recorded date in the mode recorded date field 66c and the same value in the recording number field 66d, the program moves to S27. In S27, the user specifies the data of which mode is to be moved to the end of the data contents area 62. The specified order is stored in the user specified order field 66e of the mode information area 66.

Figure 14:
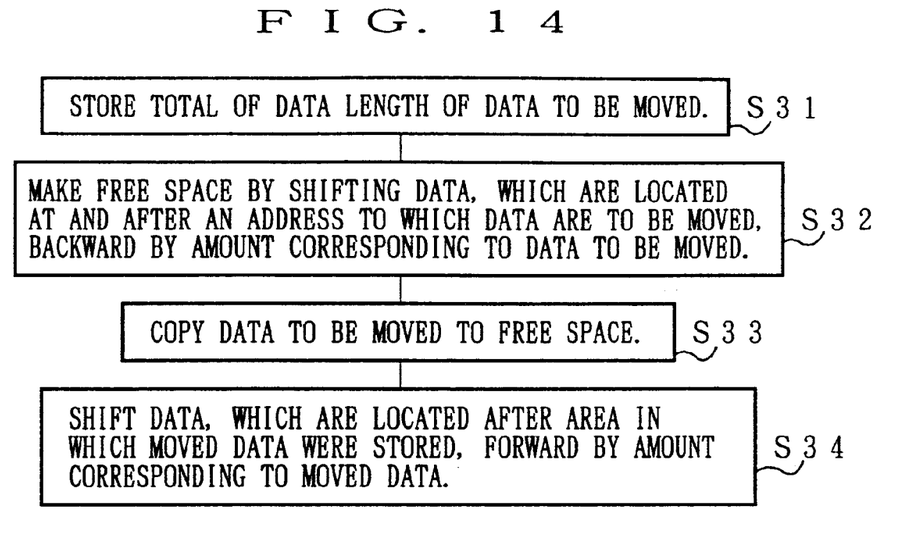
FIG. 14 is a flow chart of moving data in the data contents area.

FIG. 14 is a flow chart of a process for moving data in the data contents area 62.

First, in S31, the CPU 3 stores the value of the data length field 62d corresponding to data to be moved in the data contents area 62. Here, in the case where two or more data are to be moved, the values of the data length field 62d corresponding to all the data to be moved are added together, and the sum of the values is stored.

Next, in S32, the CPU 3 moves data which are located at and after an address to which the above-mentioned data is to be moved are shifted backward by an amount corresponding to the value stored in S31. As a result, a free space corresponding to the data to be moved is created in an area starting from the above address.

In S33, the CPU 3 copies the contents of the data to be moved into the created free space.

In S34, the CPU 3 moves data stored in space located after the space in which the moved data was originally stored forward by an amount corresponding to the data length of the moved data. Namely, the data moved to a new position by copying in S33 is deleted from the originally stored space by overwriting the following data therein.

The movement of data is completed through the above-mentioned processes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information processing apparatus for managing data of more than one kind of modes, comprising:
   a data contents memory for storing contents of data; and
   a data address memory for storing addresses of data stored in said data contents memory while grouping the addresses according to mode, wherein the addresses of the respective data are stored in said data address memory in order suitable for searching in each mode wherein the modes include at least two modes among telephone book mode, schedule mode, memo mode, and anniversary mode.

2. The information processing apparatus as set forth in claim 1, further comprising input means for inputting order in which the addresses of the respective data are stored in said data address memory,
   wherein the addresses of the respective data are stored in said data address memory in order of input while being grouped according to mode.

3. The information processing apparatus as set forth in claim 1,
   wherein said data contents memory stores contents of data to be newly recorded, after an end of contents of already stored data irrespectively of the kinds of modes.

4. The information processing apparatus as set forth in claim 1, further comprising:
   a display; and
   a deletion candidate selector for selecting a candidate for deletion from the contents of data stored in said data contents memory and for displaying the selected candidate on said display if there is no sufficient free space in said data contents memory when storing new data.

5. The information processing apparatus as set forth in claim 4, further comprising:
   a data length memory for storing data lengths of the contents of data stored in said data contents memory,
   wherein said deletion candidate selector selects a candidate for deletion based on the data lengths stored in said data length memory.

6. The information processing apparatus as set forth in claim 5,
   wherein said display displays contents of the data selected as the candidate for deletion together with the data length of the contents of said data.

7. The information processing apparatus as set forth in claim 4, further comprising a recorded date memory for storing recorded dates of the respective contents of data stored in said data contents memory,
   wherein said deletion candidate selector selects a candidate for deletion based on the dates stored in said recorded date memory.

8. The information processing apparatus as set forth in claim 4, further comprising a searched date memory for storing latest searched dates in respect of the respective contents of data stored in said data contents memory,
   wherein said deletion candidate selector selects a candidate for deletion based on the dates stored in said searched date memory.

9. The information processing apparatus as set forth in claim 4, further comprising a display conditions memory for storing display conditions for displaying a list of candidates for deletion on said display.

10. The information processing apparatus as set forth in claim 9, further comprising input means for inputting the display conditions.

11. An information processing apparatus for managing data of more than one kind of modes, comprising:
   a data contents memory for storing data while grouping the data according to mode; and
   a mode data number memory for storing the number of data stored in said data contents memory in respect of each mode; and
   moving means for referring to said mode data number memory, and moving data belonging to a mode including the largest number of data together to a head of said data contents memory.

12. An information processing apparatus for managing data of more than one kind of modes, comprising:
- a data contents memory for storing data while grouping the data according to mode;
- a latest information memory for storing changes in contents stored in said data contents memory in respect of each mode; and
- moving means for referring to said latest information memory, and moving data which have been most frequently updated recently together to an end of said data contents memory.

13. The information processing apparatus as set forth in claim 12,
- wherein said latest information memory includes an area for storing latest dates of storing data of the respective modes, and an area for storing the number of data updated on said latest dates, as the changes in the contents stored in said data contents memory.

14. An information processing apparatus for managing data of more than one kind of modes, comprising:
- a data contents memory for storing data while grouping the data according to mode;
- input means for inputting order of storing data of the respective modes in said data contents memory; and
- moving means for moving the data of the respective modes within said data contents memory according to the order input.

15. A recording medium readable by a computer, including a recorded program comprising the steps of:
- storing contents of data of more than one kind of modes in a data contents memory; and
- storing addresses where the contents of the respective data are stored in said data contents memory, in a data address memory while grouping the addresses according to mode, wherein the addresses of the respective data are stored in said data address memory in order suitable for searching in each mode wherein the modes include at least two modes among telephone book mode, schedule mode, memo mode, and anniversary mode.

* * * * *